United States Patent [19]
Miller et al.

[11] 3,786,592
[45] Jan. 22, 1974

[54] SEINE ASSEMBLY

[76] Inventors: Jack E. Miller, 325 S. Reynolds St.; Kenneth M. Garrett, 700 Allison Ave., both of Canon City, Colo. 81212

[22] Filed: Sept. 25, 1972

[21] Appl. No.: 291,918

[52] U.S. Cl. .................................................. 43/6.5
[51] Int. Cl. ............................................ A01k 79/00
[58] Field of Search .................................. 43/4, 6.5

[56] References Cited
UNITED STATES PATENTS
1,467,763   9/1923   Lybeck .................................. 43/6.5

*Primary Examiner*—Louis G. Mancene
*Assistant Examiner*—Daniel J. Leach
*Attorney, Agent, or Firm*—John G. Batchelder; Ralph F. Crandell

[57] ABSTRACT

A shallow water seine assembly especially useful for capturing large quantities of small aquatic creatures for use as live bait. An open frame is screened on two vertical sides and across its bottom to form a wide mouthed rearwardly and upwardly tapered capture chamber open at its front and top. Ski-like skids mounted on the bottom of the frame at each side of the front of the frame support the frame for sliding movement across the bottom of a pond. The rearward end of the frame in one form of the invention is mounted upon a platform which in turn is intended to be supported at opposite ends by a pair of small boats. The frame is hinged to the platform for pivotal movement about a horizontal axis normal to the direction of travel of boats. Buoyant elements are attached to the front end of the frame to support a major portion of the weight of the front end of the frame so that the entire seine assembly has a slightly negative buoyancy.

3 Claims, 6 Drawing Figures

PATENTED JAN 22 1974 3,786,592

SEINE ASSEMBLY

BACKGROUND OF THE INVENTION

Although useful in trapping other types of live bait, the seine assembly of the present invention was especially devised to enable the capture in commercial quantities of salamander larvae, commonly referred to by fishermen as "water dogs." Water dogs are found in fairly substantial quantities in ponds and are highly prized as live bait by lake fishermen. The usual methods of capturing water dogs are to use a hand net, or large sieve net, but these methods are limited in that the use of a hand net involves strenuous physical labor and the use of sieve nets is a batch type operation requiring frequent hauling and emptying of the net. The present invention employs a continuous capturing operation.

SUMMARY OF THE INVENTION

The present invention employs a relatively large seine which is adapted to be pushed ahead of a boat or support platform driven across the water at a relatively low speed—for example, at about 4 miles per hour. The seine assembly is open at its top and front and constructed with rearwardly convergent side surfaces and an upwardly inclined bottom surface, the side and bottom surfaces being covered with a screen mesh. Ski-like skids are mounted at the bottom of the front end of the seine assembly at each side to support the front end of the assembly for sliding movement across the pond bottom. The front end of the assembly is buoyed upwardly with a slight negative buoyancy so that the seine can be gravitationally held close to the bottom and yet bounce reasonably lightly over any obstacles which might be encountered. In its preferred form, the seine itself is hingedly mounted on the forward edge of a platform for pivotal movement about a horizontal axis normal to the direction of travel so that the forward end of the seine can rise and fall as required by the contours of the pond bottom. The platform is fixed at its opposite end to a pair of small boats of the type customarily referred to as "john boats" and the platform is provided with a centrally located mount for an outboard motor which can be employed to propel the boats and seine. At the rear end of the seine, immediately in front of the platform, a relatively shallow open top box-like chamber is formed. As the seine is driven forwardly through relatively shallow water, water dogs, minnows, etc. which are encompassed by the relatively wide mouth of the seine pass rearwardly into the relatively small collection chamber from which the operator, who is seated on the platform, removes them in quantities by a dip net. While water dogs are quite active, they cannot travel at high speed over very great distances, and the continued forward motion of the seine assures that water dogs which pass into the mouth of the seine will eventually overtaken and deflected into the relatively small collection chamber by the rearwardly convergent side and bottom walls.

The seine assembly may, if desired, be mounted directly on the bow of a square bowed boat, however, this arrangement requires a two man operation, one man to operate the boat and a second to remove water dogs from the collection chamber of the seine. Where the two boat-platform arrangement is employed and a single outboard motor is mounted upon the platform, a single operator can sit on the platform and pilot the boat and net captured water dogs from the seine at the same time.

Other objects and features of the invention will become apparent by reference to the following specification and to the drawings.

IN THE DRAWINGS

Figure 1:
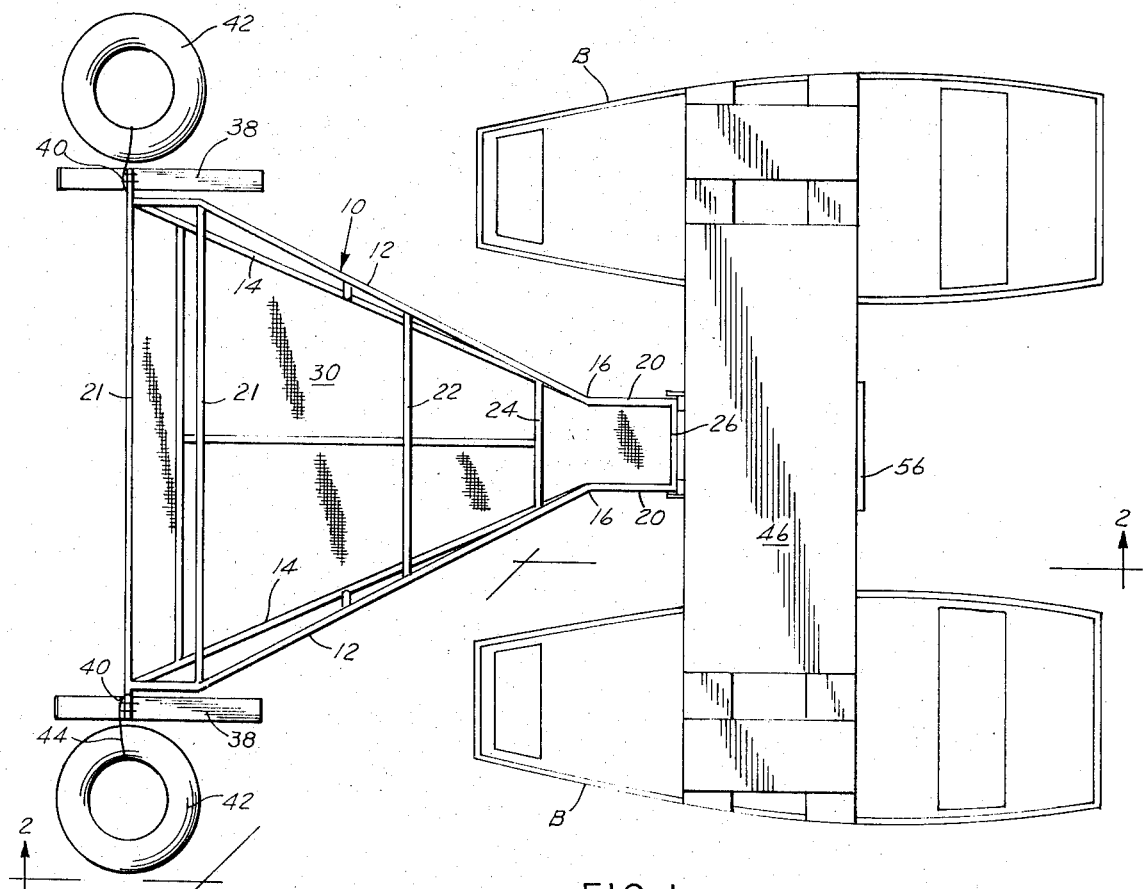
FIG. 1 is a top plan view of a seine assembly embodying the present invention, showing the two boat-platform propelling arrangement.
Figure 2:
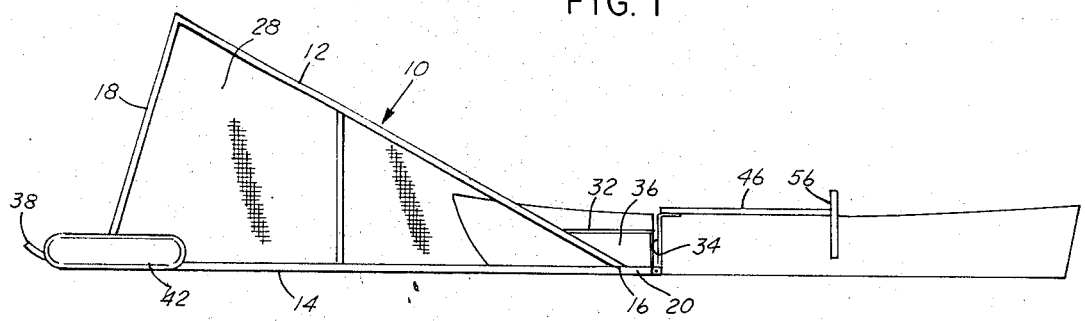
FIG. 2 is a cross sectional view taken approximately on line 2—2 of FIG. 1, showing the seine assembly and boat on dry land.
Figure 3:
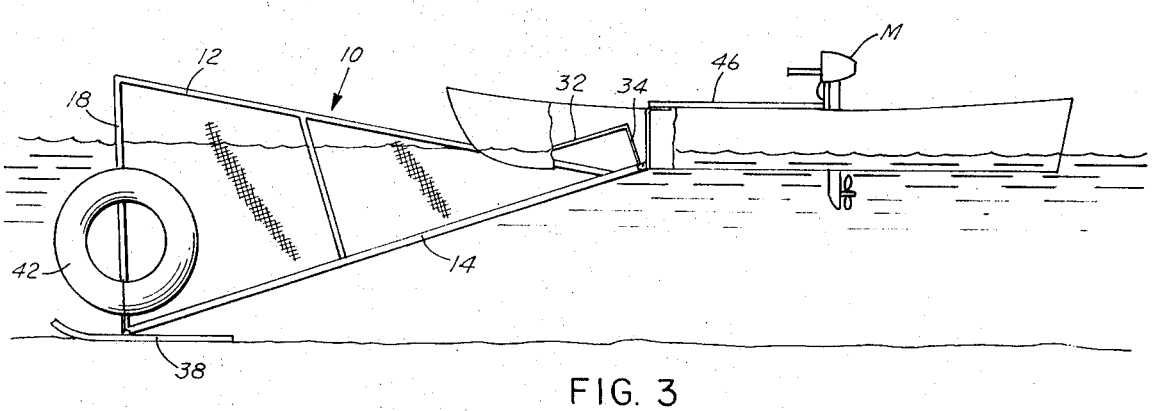
FIG. 3 is a side elevational view of the assembly of FIG. 1 showing the seine assembly operating in a typical depth of water.
Figure 4:
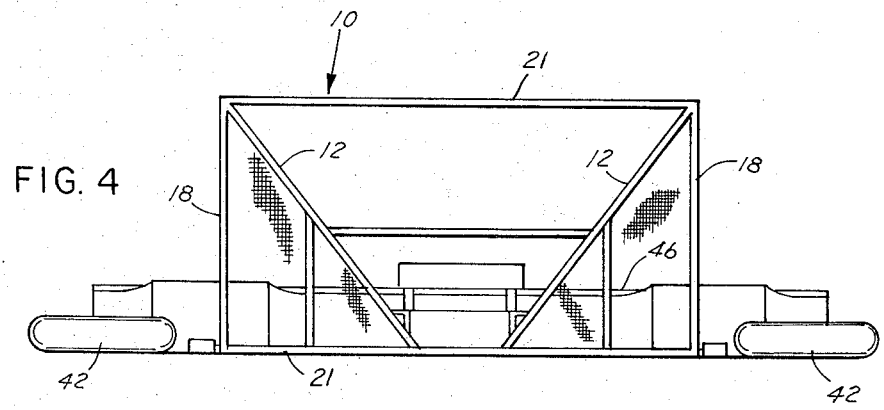
FIG. 4 is a front elevational view of the assembly of FIG. 1 on dry land.

A seine assembly 10 embodying the present invention is conveniently constructed in the form of an open framework of tube or rod stock. The frame is made up of a pair of like side frame assemblies which include a pair of relatively long frame members 12 and 14 joined to each other near their rearward ends and interconnected at their forward ends by a relatively short frame member 18. As best seen in FIGS. 2 and 3, the side frame assemblies constituted by members 12, 14 and 18 are of triangular configuration, member 14 being extended slightly as at 20 beyond the juncture 16 of members 12 and 14. Referring to the plan view of FIG. 1, the two side frame assemblies are interconnected to each other by a plurality of transversely extending horizontal frame members 21, 22, 24, 26, etc. so that the side frame assemblies converge rearwardly toward each other until the juncture of frame members 12 and 14 is reached, the rearward extensions 20 of frame members 14 being bent outwardly to extend rearwardly parallel to each other. The number of transverse frame members 21, 22, 24 and 26 and their locations will vary in accordance with the overall dimensions of the frame and rigidity of the stock from which the individual frame members are formed. The frame members conveniently are simply welded to each other at their various points of juncture.

A fairly fine mesh wire screen is stretched over and secured to the side frame assemblies as at 28 and a similar screen 30 is extended across the bottom of the frame assembly between frame members 14, screen 30 extending from the foremost transverse frame member 21 at the bottom of the frame assembly to the rearwardmost transverse frame member 26.

Figure 5:
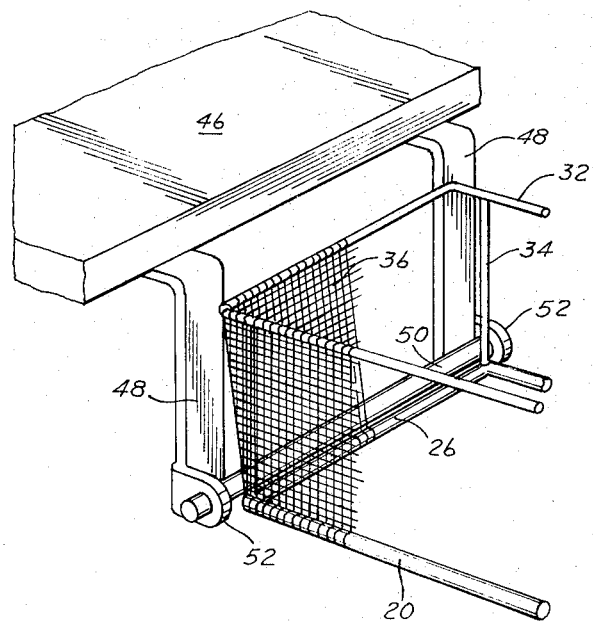
FIG. 5 is a detailed perspective view showing the structure employed to mount the seine assembly on the platform.
Figure 6:
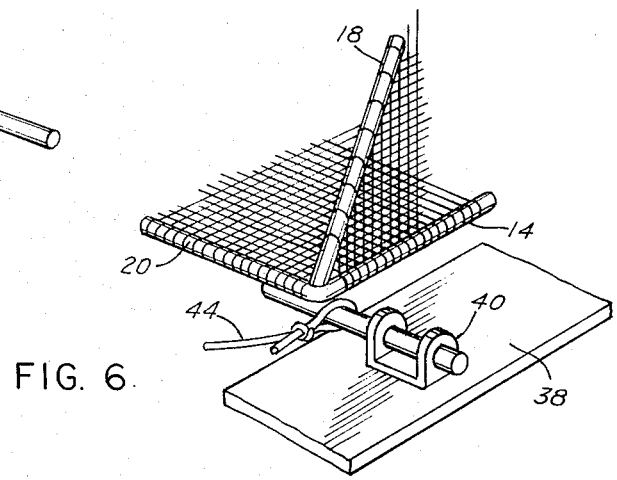
FIG. 6 is a detailed perspective view of the coupling between the seine and skid.

Referring now particularly to FIGS. 2 and 5, a box-like collection chamber is formed at the rearward end of the frame assembly by using a relatively light wire frame 32, 34, the sides and rear walls of the frame thus defined being also covered by screen mesh as at 36.

At the forward end of seine assembly 10, a pair of ski-like skids 38 are mounted at each side of the assembly at the lower end of frame member 18 as by a pivot assembly 40 so that the skid 38 can pivot freely about a horizontal axis relative to the frame while providing a sliding support for the frame assembly on a pond bottom. To counterbalance the weight of seine assembly 10 at its forward end, buoyant elements 42 are tied to the assembly by relatively short lines 44 to counterbalance the weight of the assembly to a point where the entire seine assembly has only a slight negative buoyancy.

The rearward end of the seine assembly 10, in the preferred embodiment shown in the drawings, is supported from a platform 46 by a pivotal mounting which, see FIG. 5, includes a pair of rigid arms 48 fixedly secured to platform 46 and projecting downwardly from the platform to pivotally receive a shaft 50 welded to frame member 26 of assembly 10 and rotatably received within bores formed in ears 52 integral with the lower ends of members 48. This mounting permits the seine assembly 10 to pivot about the horizontal axis of shaft 50 relative to the platform, so that the forward end of assembly 10 can move up and down in accordance with variations in the depth of water in which the assembly is operating. The opposite ends of platform 46 are fixedly secured to a pair of relatively small boats B or floats, while an outboard motor M may be mounted upon motor mount 56 fixedly secured to platform 46.

The seine assembly is usually employed in water of relatively shallow depths, up to about 5 feet, for example. A typical configuration of the assembly during operation is shown in FIG. 3. The assembly may, however, be used in deeper water when the front end of the seine is completely submerged, however, water dogs which might otherwise be trapped can escape by swimming over the submerged portions of side frame members 12.

Seine assembly 10 may, if desired, be mounted directly upon the square bow of a boat, in which event the support frame members 48 (FIG. 5) would be modified to enable them to be clamped directly to the bow of the boat. In the preferred embodiment shown in the drawings, a single person can both pilot the seine assembly by sitting on platform 46 to operate motor M and be in position to conveniently scoop water dogs from the collection chamber between extensions 20. In the case where seine assembly 10 is mounted directly upon the bow of a single boat, two persons are required, one to pilot the boat and a second to remain in the bow to scoop water dogs from the collection chamber.

While exemplary embodiments of the invention have been described in detail, it will be apparent to those skilled in the art that the disclosed embodiments may be modified. Therefore, the foregoing description is to be considered exemplary rather than limiting, and the true scope of the invention that defined by the following claims.

We claim:

1. A seine assembly for use in relatively shallow water comprising a seine structure having a pair of like side frame assemblies, each side frame assembly including a pair of relatively long first frame members joined to each other at their rearward ends and diverging forwardly from each other and a third frame member interconnecting the forward ends of said first frame members to form an open framework of triangular configuration, a series of horizontal transverse frame members interconnecting said side frame assemblies to each other and supporting said side frame assemblies in rearwardly convergent vertical general planes, screen means mounted on said side frame assemblies and extending between the lowermost first frame members of said side frame assemblies to define screened side surfaces continuous along their lower edges with a screened bottom surface, skid means mounted adjacent the lower end of said third frame members to support said seine structure for sliding movement along the bottom of a body of water, float means coupled to said seine structure adjacent the forward end thereof to impart a relatively small negative buoyancy in water to the forward end of said asembly, and boat coupling means mounted on the rearward end of said seine structure for pivotal movement about a horizontal axis extending transversely of said seine assembly.

2. A seine assembly as defined in claim 1 wherein the rearward ends of said side frame assemblies are spaced transversely from each other, means defining a generally open topped boxlike screened collection chamber at the rearward end of said seine structure, said collection chamber being located forward of said boat coupling means.

3. A seine assembly as defined in claim 1 wherein said boat coupling means comprises a platform extending transversely of said seine assembly, and means pivotally mounting the rearward end of said seine structure upon the forward side of said platform.

* * * * *